(12) United States Patent
Assad

(10) Patent No.: US 7,941,561 B2
(45) Date of Patent: May 10, 2011

(54) SYSTEM AND METHOD FOR COMMUNICATIONS OVER A COMPUTER NETWORK

(76) Inventor: Elias Assad, Ottawa (CA)

( * ) Notice: Subject to any disclaimer, the term of this patent is extended or adjusted under 35 U.S.C. 154(b) by 1308 days.

(21) Appl. No.: 11/457,348

(22) Filed: Jul. 13, 2006

(65) Prior Publication Data
US 2007/0014305 A1 Jan. 18, 2007

Related U.S. Application Data

(60) Provisional application No. 60/699,377, filed on Jul. 15, 2005.

(51) Int. Cl.
*G06F 15/16* (2006.01)
*G06F 17/00* (2006.01)
*G06F 17/20* (2006.01)

(52) U.S. Cl. ......... 709/246; 709/206; 715/221; 715/234

(58) Field of Classification Search .................. 709/203, 709/206, 246; 715/221, 234
See application file for complete search history.

(56) References Cited

U.S. PATENT DOCUMENTS

| | | | | |
|---|---|---|---|---|
| 5,870,552 A * | 2/1999 | Dozier et al. | ................. | 709/219 |
| 6,061,694 A * | 5/2000 | Janay et al. | ................... | 715/234 |
| 6,112,242 A * | 8/2000 | Jois et al. | ...................... | 709/225 |
| 6,263,352 B1 * | 7/2001 | Cohen | ........................... | 715/206 |
| 6,782,403 B1 * | 8/2004 | Kino et al. | .................... | 709/202 |
| 7,325,027 B2 * | 1/2008 | Grow et al. | ................... | 709/201 |
| 7,487,440 B2 * | 2/2009 | Gergic et al. | ................ | 715/234 |
| 7,526,491 B2 * | 4/2009 | Bass et al. | ................. | 707/999.1 |
| 2004/0261047 A1 * | 12/2004 | Ashida et al. | .................. | 716/11 |

OTHER PUBLICATIONS

W3C. "XForms 1.0", W3C Recommendation, Oct. 14, 2003, 7 pages.*

* cited by examiner

*Primary Examiner* — George C Neurauter, Jr.
(74) *Attorney, Agent, or Firm* — Gordon Thomson

(57) ABSTRACT

A system and method for formatted inter-node communications over a computer network comprises a transmitting node transmitting a message in a format acceptable to the receiving node. Message templates are created by the receiving node and then stored in a repository accessible by both the transmitting node and the receiving node. The message templates are identified by a digital ID tag and comprise a pattern of labeled fields visible to the transmitting node and accessible for message input by the transmitting node. When the transmitting nodes wishes to send a message only those templates acceptable to the receiving node will be available to the transmitting node.

23 Claims, 7 Drawing Sheets

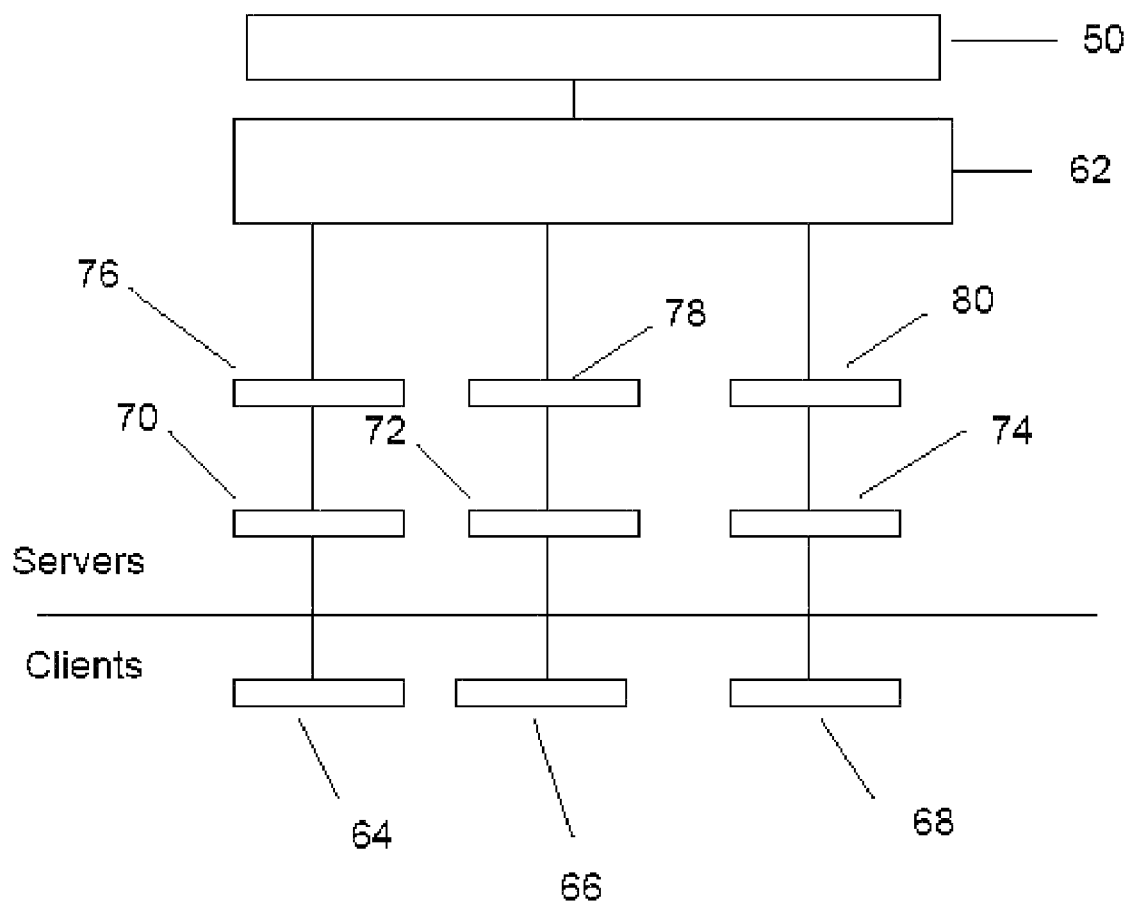

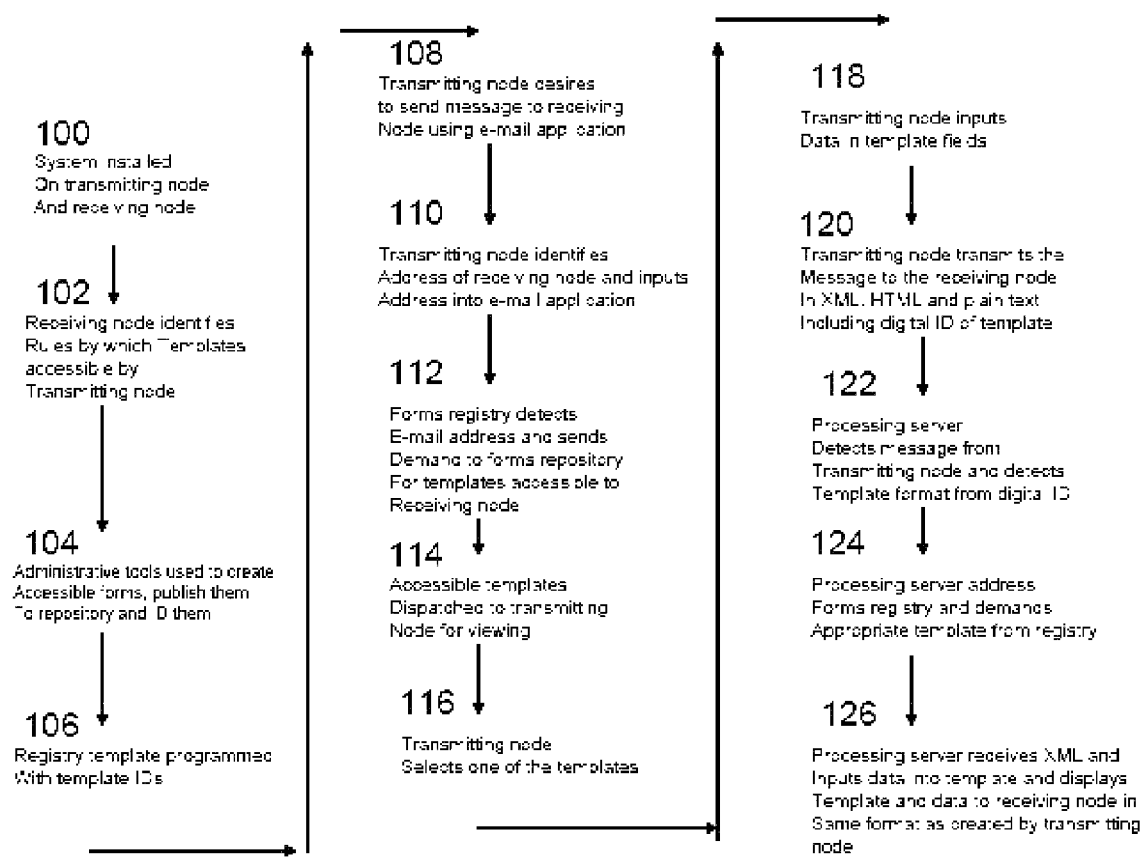

SYSTEM AND METHOD FOR COMMUNICATIONS OVER A COMPUTER NETWORK

CROSS-REFERENCE TO RELATED APPLICATIONS

This application is entitled to the benefit of Provisional Patent Application Ser. No. 60/699,377 filed on Jul. 15, 2005.

BACKGROUND

1. Field of the Invention

This invention is related to systems and method for communication over a computer network and more particularly to a system and method for formatted inter-node communications over a computer network.

2. Background of the Invention

Communications between two nodes over a computer network such as the Internet is well known and there are many commercial software applications used to facilitate messaging. However, one problem associated with most applications is that they do not control the specific types of e-mail (or other data formats) messages that be sent by a transmitting node. Furthermore, they do not control the structure, content and format of the transmitted message. This poses problems for the receiving node such as unwanted messages or poorly formatted messages that take time to recompile into useful formats to extract data. Additionally, unformatted messages may not have all of the required information that the receiving node requires to execute instructions from the transmitting node. Such shortcomings lead to an inefficient use of a computer network and reduced business efficiency.

Therefore there is a requirement for a system and method for inter-node communications over a global computer network that is able to transmit data from a transmitting node in a format that the receiving node can effectively use. There is further a requirement to restrict transmissions from a transmitting node to formatted messages that the receiving node is willing to accept.

SUMMARY OF THE INVENTION

In accordance with the present invention a system and method for formatted inter-node communications over a global computer network is provided. The system comprises a transmitting node having an address; a receiving node having an address; a communications link interconnecting the transmitting node and the receiving node; means residing on the transmitting node for creating a message; and, means for formatting the message input into an output acceptable to the receiving node. The communications network is generally the Internet and the communications format is e-mail although other formats such as "ftp" (file transfer protocol) can be used. Message templates are created in an electronic format that are acceptable to the receiving node and then stored in a repository accessible by both the transmitting node and the receiving node. The message templates are identified by a digital ID tag. Only a predetermined subset of message templates is accessible by the transmitting node pursuant to a first set of access rules that determine a specific category of users or groups of users having access to the predetermined subset. Each template in the repository comprises a predetermined pattern of labeled fields visible to the transmitting node and accessible for message input by the transmitting node. These fields conform to the output acceptable to the receiving node. A template registry is included and each template stored within the repository is registered on the template registry and addressable by the template registry when the transmitting node wishes to send a message. The template registry will retrieve only those predetermined message templates accessible by the transmitting node and dispatch them to the transmitting node in accordance with the first set of access rules. The templates are displayed at the transmitting node as a menu of selectable templates. The user at the transmitting node will select the appropriate template and complete all fields on the template. The message is sent in "MIME" (Multipurpose Internet Mail Extension) encoded and transmitted to the receiving node in XML, read-only HTML and plain test formats. In this way, the receiving node will receive the message in a human readable form. The receiving node will retrieve the template used by the transmitting node and display the message at the receiving node in the same format it was sent. The invention discloses a method to effect formatted inter-nodal transmission of data

OBJECTS AND ADVANTAGES

Accordingly, besides the objects and advantages of the system and method of the invention described herein, other objects and advantages are:

to provide a system and method that ensures data is received by a receiving node in an acceptable format;

to provide a system and method that controls the types of messages that can be sent by a transmitting node and received by a receiving node;

to provide a system and method that increases the efficiency of communications between two nodes over a global communications network;

to provide a system and method that increases the productivity of organizations engaged in inter-nodal communications over a computer network; and, to provide a system of method that creates acceptable templates and stores them in an electronically accessible repository for use by a transmitting node.

Still further objects and advantages will become apparent from a consideration of the ensuring description and drawings.

DRAWING FIGURES

FIG. 6 is a schematic diagram of additional detail of the forms broker of one embodiment of the present invention.

FIG. 7 is a flow diagram of one methodology of one embodiment of the present invention.

DETAILED DESCRIPTION

Figure 1:
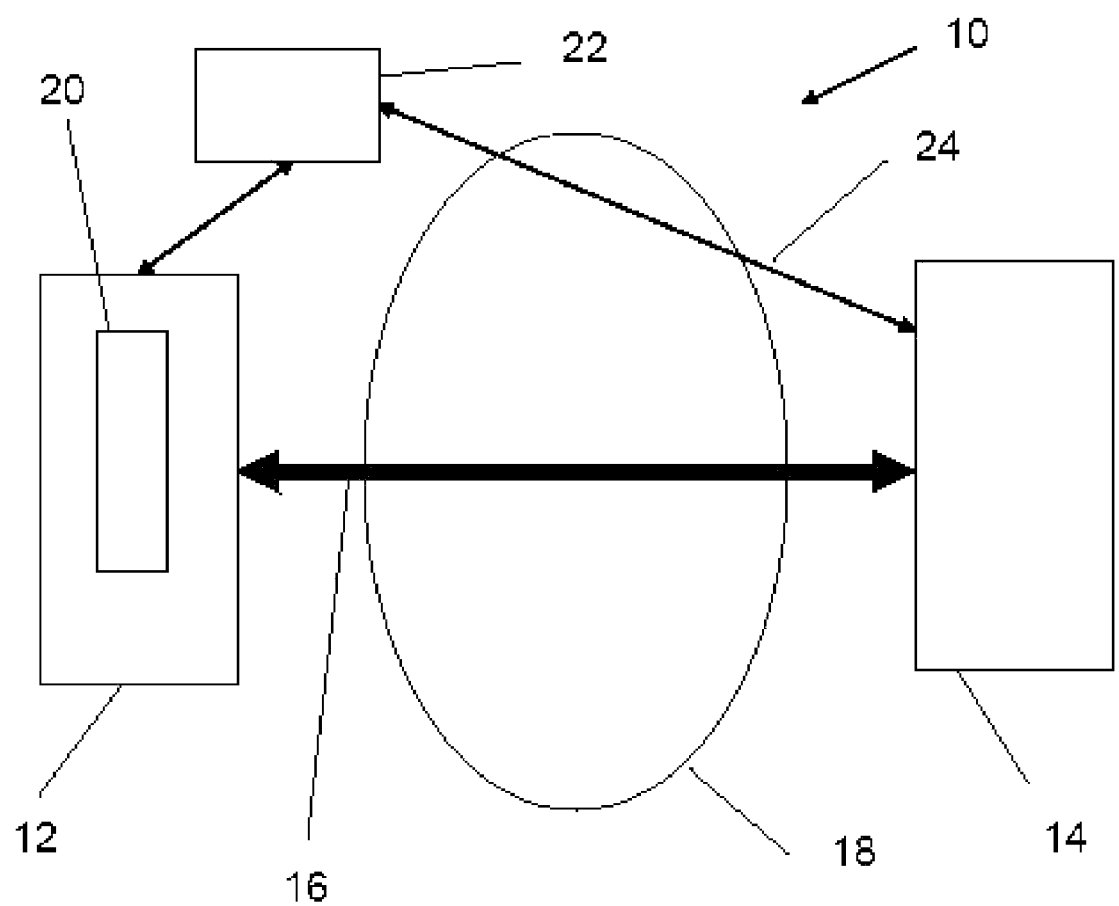
FIG. 1 is a schematic diagram of one a computer network over which two nodes communicate.

Referring to FIG. 1, the invention is a system and method for formatted inter-node communications over a computer network (10). The computer network in this simple schematic comprises the following main components: transmitting node

(12) having an address; receiving node (14) having an address; and a communications link (16) through the computer network (18) for interconnecting the transmitting node and the receiving node. Residing on the transmitting node there is means for creating a message (20) such as an e-mail program, "ftp" (file transfer protocol) program, a mobile application or a web browser program. In order the format the message in accordance with the invention there is included means (22) in communication with the transmitting node for formatting message inputs at the transmitting node into an output acceptable to and pre-approved by the receiving node. Since the receiving node exercises oversight over the format in which it will receive messages from the transmitting node it is in communication (24) with formatting means (22) through the communications network (20). The system can be global in nature, that is, communications through the communications network can be global and rely upon the message formatting means described by this invention from any access point to a global information network. As well, one embodiment of the invention includes a global registry in which all approved corporate documents reside on a global registry which can be accessed by any authorized transmitting node or receiving node on a corporate network. Access to the communications network can be further secured using authentication and authorization techniques in a layered format such as PKI or SSL or other systems known in the art of network security.

Figure 2:
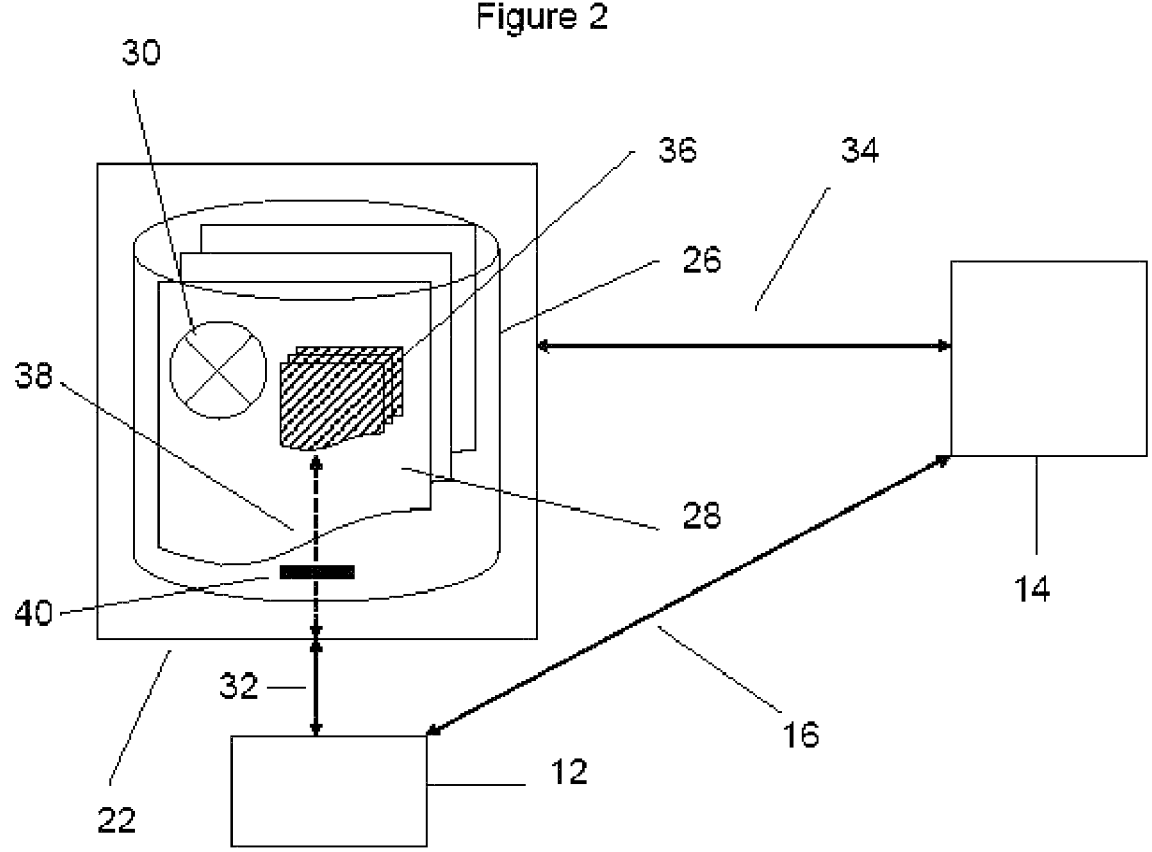
FIG. 2 is a schematic diagram of one embodiment of the invention where the repository of templates and its relationship to the communicating nodes is illustrated.

Referring now to FIG. 2, means for formatting the message in a manner acceptable to the receiving node (22) comprises means (26) for storing a plurality of predetermined message formats (28) acceptable to and pre-approved by the receiving node (14). In this way only the receiving node is permitted to publish message formats to be stored. Storage means (26) is a repository of message templates. Within the repository each of the message templates is tagged with a digital ID tag (30). The repository is preferably a "RDBMS" (Relational Database Management System). This type of system is well suited to the invention as templates can be stored in an efficient, reliable and scalable manner. The repository is in communication (32) and (34) with the transmitting node (12) and the receiving node (14). The transmitting node and receiving node communicate with the repository using "HTTP" (Hypertext Transfer Protocol).

Still referring to FIG. 2, means for formatting the message (22) further includes means for identifying a predetermined subset of message templates (36) accessible (38) by the transmitting node pursuant to a first set of access rules (40) that relate a subset of templates to a particular transmitting node or group of transmitting nodes.

Figure 3:
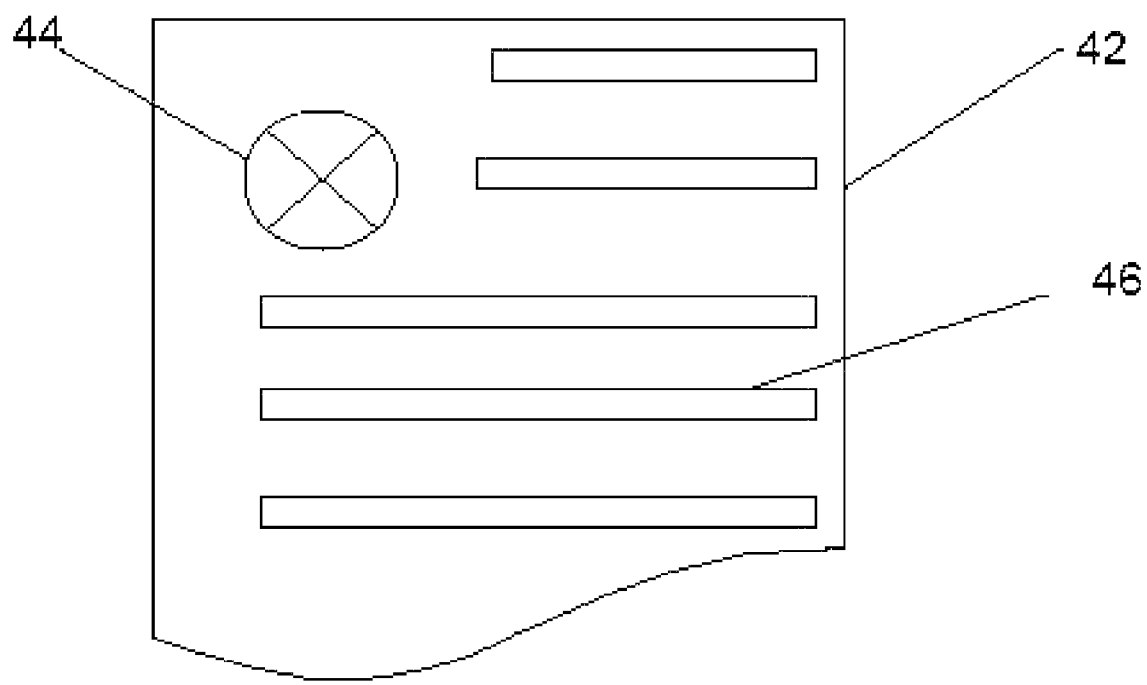
FIG. 3 is a schematic diagram showing a message template of one embodiment of the present invention in detail.

Referring now to FIG. 3, there is shown schematically a single message template (42) of the type stored in the repository. The templates are expressed in an electronic forms format such as XFORMS or INFOPATH which are well-recognized and standard specifications to implement forms in XML. To display and edit the electronic forms the transmitting node can either implement its own editor or integrate other components. The message template is tagged digitally (44). Each template in the repository comprises a predetermined pattern of labeled fields (46) visible to the transmitting node and accessible for message input by the transmitting node. Depending on the type of message that is to be sent by the transmitting mode the labeled content of the fields will vary. For example, in the template shown, the fields may represent a telephone message and so the fields will receive such data as the time of the call, from whom, callers phone number, urgency of the call, details of the message and other relevant data. Other templates in the repository will be similarly configured to represent any type of form necessary. Examples might include: order forms, reporting forms and request forms. What ever the intended content of the form the predetermined pattern of labeled fields will conforms to output acceptable to the receiving node.

Figure 4:
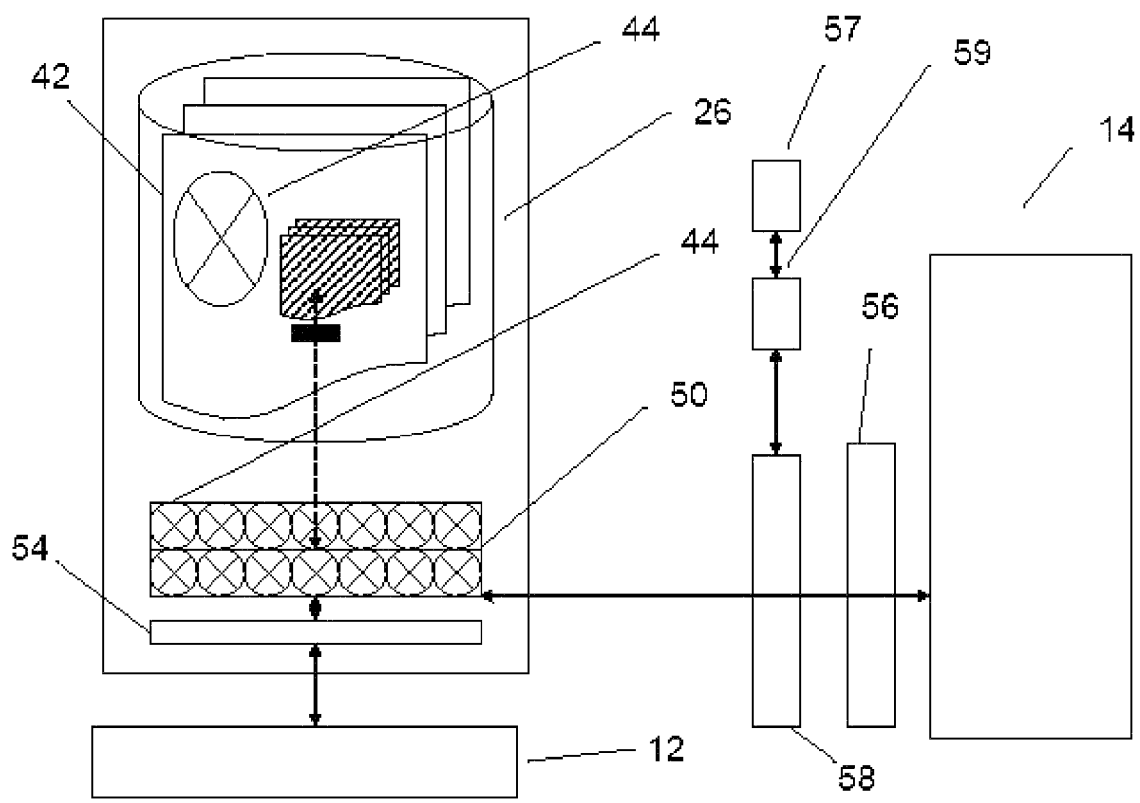
FIG. 4 is a schematic diagram of one embodiment of the present invention showing the template registry and its relationship with other components.

Referring now to FIG. 4, there is shown a schematic of the template registry (50) and its relationship with the repository (26), transmitting node (12) and receiving node (14). Each template (42) stored within the repository is registered on the template registry and addressable by the template registry by the digital tag (44). So when the transmitting node (12) desires to send a message to the receiving node (14), a template retrieval demand (52) will be send to the registry from the transmitting node as soon as the transmitting node indicates who the recipient of the message is going to be. For example, in this schematic diagram, the obvious recipient is the receiving node. Hence the demand send to the template registry will be to retrieve and dispatch to the transmitting node only those templates that the first set of access rules have determined that the transmitting node has access to. However, in another embodiment of the invention, the demand may be made verbally at the transmitting node by way of speech synthesis means. Once the proper form is selected the form can be completed by way of speech to text conversion means.

Still referring to FIG. 4, the invention further includes a "DAL" (Data Abstraction Layer) (54) disposed between the transmitting node (12) and the forms registry (50). The purpose of the DAL is to separates the logic of the application from the functions that retrieve data from a database. Therefore the repository is logically isolated from the database and the DAL translates demands from the registry to the repository in both directions. When the transmitting node identifies the receiving node by its e-mail a retrieval demand is executed through the DAL to the template registry. The transmitting node is only permitted access to a limited number of forms that are predetermined and pre-approved by the receiving node as a first set of access rules. Predetermination and pre-approval are executed by the first set of access rules established by the receiving node during the implementation of the invention on the communication system. These forms are identified by their digital tags in the registry and in the repository. Hence the registry will request a dispatch of the permitted forms from the repository to the transmitting node. These forms will be displayed at the transmitting node and the sender will be able to select the appropriate form to use to send the message. The retrieval and dispatching demand is a "SOAP" (Simple Object Access Protocol) demand. The fields of the message template are completed at the transmitting node and then the message is MIME encoded for transmission to the receiving node in XML, read-only HTML and plain text formats. The XML format message will be extracted from the form completed at the transmitting node. The XML format is a machine-friendly format and can be used to trigger automated processes based on the information contained in transmitted forms. The HTML format will represent the message data as well as the form template for the receiving node so that the receiving node can read the message even if it does not have the invention installed. The plain text message will display the message without any template presentation or formatting and will permit the recipient node to read the message if it is not HTML capable and does not have the invention installed. Using plain text and HTML message formats permits deployment of the invention widely where receiving nodes do not have the invention installed or without the modification of existing desktop systems and servers.

There is a validation step that is performed by the validation rules contained in the template. Any errors in completing the template will be displayed at the transmitting node so that they can be corrected before the message is sent.

The message is transmitted with the digital ID tag attached so that the receiving node can identify the template that is being used by the transmitting node. The receiving node further includes a processing server (58) in communication with the receiving node (14) and the template registry (50).

Still referring to FIG. 4, the system further includes a "SAL" (Server Abstraction Layer) (56) between the receiving node (14) and the processing server (58). The purpose of the SAL is to isolate the transmitting node from a single registry server. The transmitting node relies upon the SAL to contact one or many registry servers to solve a particular transmitting node request. When the processing server detects the incoming message data and the digital ID tag it will send a request to the registry to dispatch to the receiving node the template used by the transmitting node pursuant to a second set of access rules. The message will be displayed in a human readable form at the receiving node in the same format as it was transmitted if the invention is installed on the receiving node. If it is not, then the message can be read in HTML in a template format or in text format without any use of a template.

Still referring to FIG. 4, there is shown another feature of the invention which permits the system to be extended to other unpredictable data processing needs of future clients. The process server (58) is adapted to accept customized process modules (57) within a processing module layer (59). For example, the processing server could be customized for a particular industry wherein the processing module layer contained all of the language processing requirements of that industry.

Figure 5:
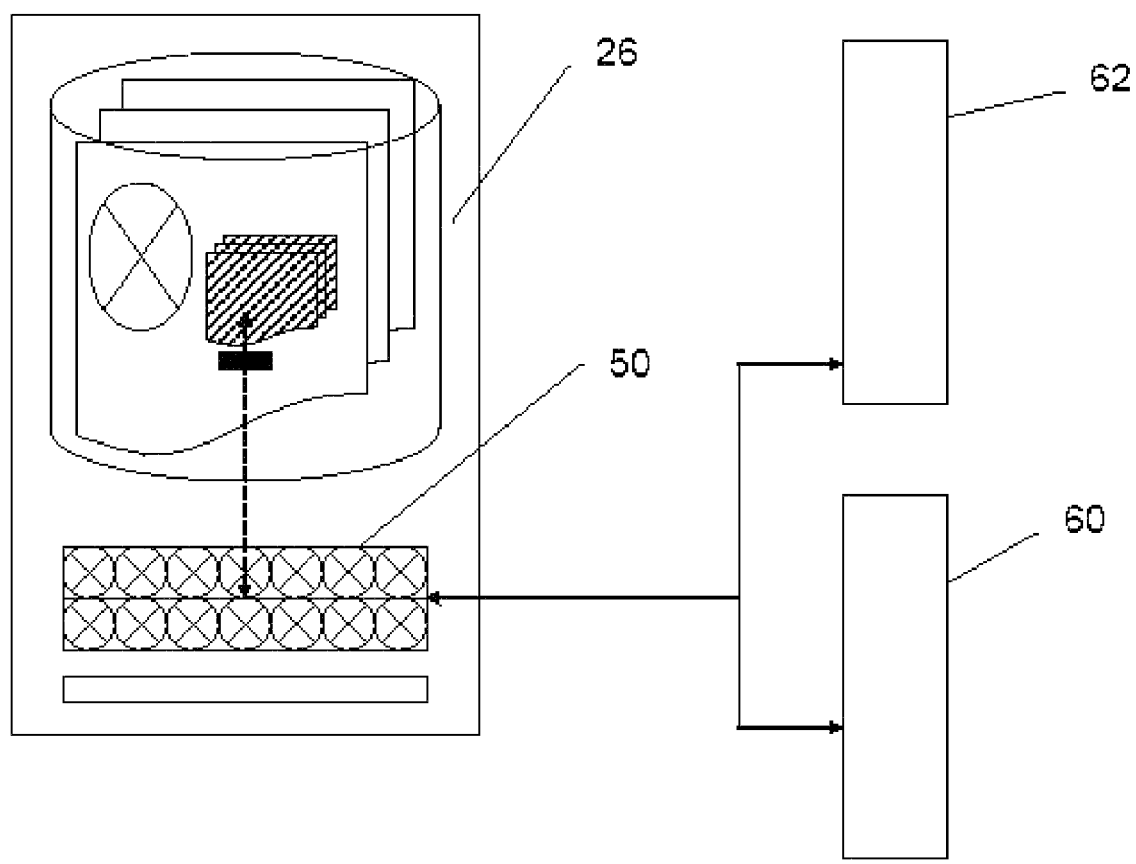
FIG. 5 is a schematic diagram of the administrative tools and form brokers of one embodiment of the present invention.

Referring to FIG. 5, there is shown the repository (26) and the template registry (50). Associated with the template registry is an administrative module (60) that includes set of applications including a template creator/editor permitting the creation and editing of templates to be used by the invention for the communication system upon which it is installed. The administrative module also permits the publication of new forms to the repository, the ability to link templates by their digital codes to specific users or user groups, defining a first set of access rules to govern the template dispatching mechanism and data processing when a template formatted message enters the system. The first set of access rules are associated with the templates and define a specific category of users or groups of users who have access to the template. Also shown in FIG. 5 is the form broker module (62) that is also in communication with the registry (50).

Referring to FIG. 6, the function of the forms broker (62) is illustrated in more detail. The forms broker is in communication with the registry (50). The forms broker extends the present invention beyond the e-mail environment and permits the invention with its template-driven data collection system to be used in other environments such as web-based browsers (64), a mobile client (66) or an ftp client (68) that will be transmitting data through a WEB application (70), a WAP (Wireless Application Protocol) application (72) or a FTP application (74). A diversity of programming languages will be used by the invention including DHTML (76), WML (Wireless Markup Language) (78) and FTP (80). The forms broker (62) will be able to produce the appropriate form so that the language used by the client can be adapted to the templates available in the system.

In another embodiment the invention can operate using a telephony system. The telephony system can be a VoIP (Voice Over Internet Protocol) environment system or a cellular telephone system environment. In this embodiment, the transmitting node dials a number and automatically retrieves the permitted templates. The templates can be completed using IVR (Interactive Voice Response) and speech to text synthesis in which case an IVR interface to the registry is included. Therefore, the first set of rules used to determine what forms pre-approved by the receiving node to dispatch to the transmitting node would, in this embodiment, include the telephone number of the recipient as well as the e-mail address of the recipient. In an IVR setting a phone user dials a phone number to access an IVR interface to the registry server. The IVR interface answers the call, and pulls a form from the registry based on a set of access rules and following some prompts by the transmitting node. The IVR interface translates the labels of different fields in the form into voice prompts to the user. The IVR interface translates user voice input into text into the fields corresponding to said prompts. The IVR interface generates an email message containing the form and the translated input of the user (a filled form), as called for in the invention (XML, HTML and plain text). The email message thus generated can be sent to the receiving node associated with the phone number and access rules. The email message can optionally be sent to other email addresses if entered as part of the call (e.g., to the person making the call).

Referring now to FIG. 7, there is a flow diagram illustrating the steps taken to transmit a message from the transmitting node to the receiving node wherein both nodes have the invention installed (100). In order to restrict access by the transmitting node to only those templates required, a first set of rules is established by the receiving node determining which templates the transmitting node will have access to (102). The administrative tools are used to create, edit and publish the forms to the repository and each form that is accessible by the transmitting node will have a digital ID associated with it (104). The template registry will be programmed with the forms accessible by the transmitting node by digital ID (106). In operation, the transmitting node will wish to send a message to the receiving node (108). This message can be an e-mail message or it could be a form for ordering spare parts or it could by the record of a telephone call that was missed. The transmitting node will activate, for this example, its e-mail application and input the e-mail address of the receiving node in the "TO" field (110). The forms registry will detect the e-mail of the receiving node and automatically identify those templates that the receiving node has tagged as accessible to the transmitting node and request them from the repository (112). The previously identified accessible templates will be dispatched by the registry to the transmitting node and displayed at the transmitting node as a menu of templates from which to choose (114). The transmitting node will select the appropriate template for the message (116) and complete the fields of the template (118). Once the form is complete, the transmitting node will send the message to the receiving node (120). If the template is incorrectly completed, the validation program within the template will detect and display any error to the transmitting node and prevent the message from being sent with errors. Once the message is successfully send, it will comprise XML, HTML and plain text formats as well as the digital ID of the template used to create the message. The processing server will detect the message coming into the receiving node and identify the ID of the template used at the transmitting node (122). By a second set of rules, the processing server will address the forms registry with the template ID and the forms registry will dispatch the template to the receiving node processing server (124). The receiving node will display the message using the XML formatted text and the template from the repository in the same format was it was transmitted and displays the completed template at the receiving node (126). In the event that the receiving node is not able to display the template, the message will be displayed in one of the alternate formats such as HTML with the template or plain text without the template.

In another embodiment of the invention, the recipient node's e-mail address used by the transmitting node could be used as a pointer to a web site according to another set of access rules. The transmitting node would be directed to the web site with links to the templates. The templates could then be completed while the transmitting mode was still in the e-mail application.

In another embodiment of the invention, a global registry is contemplated wherein authorized individuals collaborate, share and re-use templates posted on the registry. Access to the global registry would be secured using standard authentication techniques and secure communication protocols such as HTTPS which is a secure variant of HTTP using SSL for security. For a global registry, only the recipient node will be allowed to publish forms associated with its e-mail address or telephone number to the template registry. The difference between a global registry and a domain-specific registry is mainly the way in which it is addressed. The address of a global registry will be included in the software as part of the distribution (e.g., registry.formverse.com), and updated online if and when the need arises, while a domain-specific registry is addressed based on naming convention (the transmitting node uses the domain name in the recipient's address to make the host name of the global registry, e.g., for email to help@companyx.com: <mailto:help@companyx.com the registry host name would be formverse.companyx.com.).

The system of the invention is intended to be marketed as a computer program product for providing formatted internode communications over a computer network. It will contain one or more computer readable media and comprise computer readable program code means for creating a message on a transmitting node; and, providing means for formatting the message input into an output acceptable to a receiving node. Means for creating the message will be one of an e-mail program, a web browser program, a FTP program or a mobile application. Means for formatting the message will comprise a forms repository containing message templates acceptable to the receiving node and accessible to the transmitting node; a forms registry wherein each form is identified by a digital ID and whereby acceptable forms are retrieved and dispatched to the transmitting node; a processing server having readable program code means for identifying a message sent by the transmitting node and the ID of the template used then retrieving the template and recreating the formatted message that was created on the transmitting node. Administrative tools to create, edit and publish forms to the repository are also contained in the computer program. Where other clients are contemplates, a forms broker is installed to ensure compatibility between the templates stored in the repository and the client application.

Although the description above contains much specificity, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A system for communication over a computer network, said system comprising: a transmitting node having an e-mail address; a receiving node having an e-mail address; a communications link interconnecting said transmitting node and said receiving node; means residing on the transmitting node for creating a human readable message comprising one of: an electronic mail program, "ftp" (file transfer protocol) program, a mobile application and a web browser program; a repository of message templates comprising a "RDBMS" (Relational Database Management System) for storing predetermined human readable message templates acceptable to said receiving node, and comprising a predetermined pattern of labelled fields conforming to said output acceptable to the receiving node and visible to the transmitting node and accessible for message inputting by the transmitting node; wherein, each message template of said repository is identified by a digital ID tag; and, wherein the repository is in communication with the transmitting node and the receiving node by said communications link, and wherein a predetermined subset of message templates is accessible by the transmitting node pursuant to a first set of access rules determining a specific category of users or groups of users having access to said predetermined subset and for determining a specific website accessible by the transmitting node, said specific website containing HTTP-based forms for transmission; and, wherein the system further comprises a message template global registry wherein each message stored within the repository of message templates is registered on said template global registry and addressable by the template global registry upon a retrieval demand by the transmitting node; and, wherein a "DAL" (Data Abstraction Layer) is interposed between the template registry and the repository of message templates; and wherein, said retrieval demand is executed upon inputting of said receiving node address by the transmitting node; and wherein, the retrieval demand is executed upon the transmitting node making a verbal request using a telephony system.

2. The system of claim 1 wherein said telephony system is a VOIP system.

3. The system of claim 1 wherein the telephony system is a cellular telephone system.

4. The system of claim 1 wherein the retrieval demand is executed upon the transmitting node making a telephone call to a predetermined telephone number.

5. The system of claim 1 wherein the retrieval demand actions the template registry to retrieve said predetermined subset of message templates and dispatch them to the transmitting node in accordance with the first set of access rules.

6. The system of claim 5 wherein the retrieval demand is a "SOAP" (Simple Object Access Protocol) demand.

7. The system of claim 6 wherein the predetermined subset of message templates dispatched to the transmitting node is displayed at the transmitting node as a menu of selectable templates.

8. The system of claim 7 wherein the transmitting node selects an appropriate message template from the predetermined subset of message templates, inputs message data into said appropriate message template to form a completed message template and transmits said completed message template to the receiving node.

9. The system of claim 8 wherein the completed message template is based on electronic forms.

10. The system of claim 9 wherein the completed message template is based on XFORMS.

11. The system of claim 9 wherein the completed message template is based on INFOPATH.

12. The system of claim 8 wherein said message data is "MIME" (Multipurpose Internet Mail Extension) encoded and transmitted to the receiving node in one of XML, read-only HTML and plain text formats.

13. The system of claim 12 wherein the completed message template includes said digital ID tag.

14. The system of claim 13 further including a processing server in communication with the receiving node and the message template registry.

15. The system of claim 14 further including a "SAL" (Server Abstraction Layer) disposed between said processing server and the receiving node.

16. The system of claim 15 wherein the processing server detects the incoming completed message template and the digital ID tag and requests the associated message template from the message template registry in accordance with a second set of rules.

17. The system of claim 16 wherein the message received by the receiving node is in human readable form.

18. The system of claim 17 wherein the processing server further includes an installable processing layer adapted to receive installable processors so that the system may be customized for data processing.

19. The system of claim 18 further comprising an IVR (Interactive Voice Response) means for verbal communications with the message template registry.

20. The system of claim 19 wherein said IVR means is accessible telephonically.

21. The system of claim 20 wherein the IVR means is adapted to identify and dispatch to the transmitting node message templates identified by an IVR set of access rules.

22. The system of claim 21 wherein said transmitting node message templates comprise data fields and further wherein said data fields are completed by IVR speech to text synthesis and subsequently transmitted to the receiving node.

23. A computer software system comprising a set of instructions on a non-transitory computer readable medium for providing human readable communications between a transmitting computer having an e-mail address and a receiving computer having an e-mail address, wherein said transmitting computer and said receiving computer are connected to a computer network, and wherein said computer software system comprises a set of instructions comprising:

a. a process for installing one of an electronic mail application, a "ftp" (file transfer protocol) application, a mobile application or a web browser on the transmitting computer;

b. a process for storing predetermined human readable message templates acceptable to the receiving computer in a message template repository;

c. a process for identifying each human readable message template by a digital ID;

d. a process for establishing HTTP-based communications between said message template repository and the receiving computer and the transmitting computer;

e. a process for establishing a set of access rules so that the transmitting node has access to a predetermined subset of human readable message templates;

f. a process for registration of each human readable message template within an addressable message template registry;

g. a process for the transmitting computer to retrieve from the message template registry an appropriate human readable message template from said predetermined subset of human readable message templates in accordance with said set of access rules;

h. a process for inputting message data upon said appropriate human readable message template;

i. a process for transmitting said message data to the receiving computer;

j. a process for the receiving computer to receive the message data;

k. a process for the receiving computer to retrieve the appropriate human readable message template from the template repository;

l. a process for the receiving computer to translate the message into a human readable form using the appropriate human readable message template; and, m. a process for creating a forms broker to ensure compatibility between the templates stored in the repository and a client application.

\* \* \* \* \*